United States Patent
Maret et al.

(10) Patent No.: US 7,974,357 B2
(45) Date of Patent: Jul. 5, 2011

(54) METHOD AND DEVICE FOR CARRYING OUT FLEXIBLE DEMODULATION IN AN OFDM-CDMA SYSTEM

(75) Inventors: Luc Maret, Grenoble (FR); Dimitri Ktenas, Fontaine (FR); Mathieu Bouvier Des Noes, Grenoble (FR); Chiara Martinelli-Cattaneo, Sergy (FR)

(73) Assignee: Commissariat a l'Energie Atomique, Paris (FR)

( * ) Notice: Subject to any disclaimer, the term of this patent is extended or adjusted under 35 U.S.C. 154(b) by 642 days.

(21) Appl. No.: 12/093,925

(22) PCT Filed: Nov. 14, 2006

(86) PCT No.: PCT/FR2006/002519
§ 371 (c)(1),
(2), (4) Date: May 15, 2008

(87) PCT Pub. No.: WO2007/057558
PCT Pub. Date: May 24, 2007

(65) Prior Publication Data
US 2008/0291888 A1    Nov. 27, 2008

(30) Foreign Application Priority Data
Nov. 16, 2005   (FR) ..................... 05 11613

(51) Int. Cl.
*H04L 5/12* (2006.01)
*H04L 27/06* (2006.01)
(52) U.S. Cl. ...................... 375/261; 375/341
(58) Field of Classification Search .......... 375/260, 375/261, 262, 341
See application file for complete search history.

(56) References Cited

U.S. PATENT DOCUMENTS

| | | | |
|---|---|---|---|
| 2008/0215950 A1* | 9/2008 | Shen et al. | 714/755 |
| 2010/0005363 A1* | 1/2010 | Eroz et al. | 714/755 |
| 2010/0265865 A9* | 10/2010 | Vijayan et al. | 370/312 |
| 2010/0284480 A1* | 11/2010 | Jia et al. | 375/260 |

FOREIGN PATENT DOCUMENTS
FR    2 866 770    8/2005

OTHER PUBLICATIONS

Stefan Kaiser, "Trade-off between Channel Coding and Spreading in Multi-Carrier CDMA Systems", 1996 IEEE $4^{th}$ International Symposium on Spread Spectrum Techniques and Applications Proceedings, Sep. 22-25, 1996.
Filippo Tosato & Paola Bisaglia, "Simplified Soft-Output Demapper for Binary Interleaved COFDM with Application to HIPERLAN/2", 2002 IEEE International Conference on Communications, Apr. 28-May 2, 2002.
International Search Report, Apr. 24, 2007.
PCT Request in French, Sep. 26, 2006.
PCT Written Opinion in French, Apr. 24, 2007.

* cited by examiner

*Primary Examiner* — Don N Vo
(74) *Attorney, Agent, or Firm* — Brinks Hofer Gilson & Lione

(57) ABSTRACT

This method for carrying out the flexible demodulation of data modulated following an amplitude modulation in quadrature is used in a communications system employing a code division multiple access technique (CDMA) and an optical frequency division multiplexing (OFDM) using non-binary spread codes. The invention includes steps for determining a simplified expression specific to the logarithm of the likelihood ratio.

12 Claims, 2 Drawing Sheets

METHOD AND DEVICE FOR CARRYING OUT FLEXIBLE DEMODULATION IN AN OFDM-CDMA SYSTEM

PRIORITY CLAIM

This application is a U.S. nationalization of PCT Application No. PCT/FR2006/002519, filed Nov. 14, 2006, and claims priority to French Patent Application No. 0511613, filed Nov. 16, 2005.

TECHNICAL FIELD

The present invention relates to a method and a device for soft demodulation (or "soft demapping") in an OFDM-CDMA system ("Orthogonal Frequency Division Multiplexing—Code Division Multiple Access"). More precisely, the subject of the invention is the definition of several Logarithms of the Likelihood Ratio (LLR) for an OFDM-CDMA system using nonbinary spreading codes.

BACKGROUND

The LLR is used by data decoding algorithms working with a so-called "soft" input, that is to say one that is not reduced to the two "hard" values "0" and "1". The LLR measures the probability that the bit input to the decoder is a "0" or a "1". It consists in calculating a soft value for each of the bits inside a complex symbol modulated according to a quadrature amplitude modulation (QAM), doing so independently for the bits of one and the same QAM symbol received. The principle is to demodulate the signal received into one or more soft bit(s) whose sign corresponds to the bit which would be provided by a hard-decision detector and whose absolute value indicates the reliability of the decision of the I/Q demodulation module (or "I/Q demapping module").

As shown in FIG. 1, in a conventional OFDM-CDMA transmitter with channel coding, a binary information stream d(k) is generated for each user k. Each binary stream is then coded with the aid of a channel coder $10_1, 10_2, \ldots, 10_K$, K being the total number of users. The types of channel coders that are able to benefit from the present invention are all those whose corresponding decoder at the receiver level uses soft values as input. Thus, the block performing the channel coding may consist for example:

of a convolutional coder, of a puncturer and of a bit interleaver (the puncturing device makes it possible to obtain the coding rate desired for the application whereas the interleaver avoids error packets on reception), or of a turbocoder, of a puncturer and of a bit interleaver, or of a coder using block codes with soft-input decoder, of the LDPC ("Low-Density Parity-Check Code") type.

The coded binary stream b(k) is then transformed into a series of complex M-QAM symbols a(k), by means of a quadrature amplitude modulator $12_1, 12_2, \ldots, 12_K$. The integer M corresponds to the number of complex symbols or points in the constellation associated with the modulation. Throughout what follows, it is assumed that M is a power of 2, i.e. $M=2^m$ with m a strictly positive integer. One has for example a 2-QAM modulation, also called BPSK, or a 4-QAM modulation, also called QPSK, or a 8-QAM modulation, etc. If m=2u with u a strictly positive integer, one speaks of square QAM constellation (for example 4-QAM, 16-QAM, 64-QAM, etc.). The 2-QAM modulation (BPSK) using only the in-phase pathway (I pathway), the formulae developed, subsequently in the description, for the quadrature pathway (Q pathway) are to be disregarded for a 2-QAM.

The symbol $a(k)=a_I(k)+j\cdot a_Q(k)$ corresponds to the complex M-QAM symbol of the user k and $\{b_{I,1} \ldots b_{I,q} \ldots b_{I,mI} b_{Q,1} \ldots b_{Q,q} \ldots b_{Q,mQ}\}$ is the corresponding coded binary sequence ("0" or "1") in the case of a square constellation. The index q corresponds to the $q^{th}$ bit of the in-phase part of the signal (I pathway) and to the $q^{th}$ bit of the quadrature part of the signal (Q pathway), and mI and mQ are the number of bits on the I pathway and on the Q pathway, respectively.

The M-QAM symbols are then spread in a module $14_1, 14_2, \ldots, 14_K$ by spreading codes $\{c_{k,l}\}, 1 \leq k \leq K$ and $1 \leq l \leq N$ (N being the number of sub-carriers) specific to each user k, and are then summed in a module 16. They then undergo a serial-parallel conversion in a module 18, followed by an inverse fast Fourier transformation (IFFT) in a module 20. It is assumed that the transmitter separates the OFDM-CDMA symbols with a guard interval (GI) that is long enough to remove the inter-symbol interference (ISI). This guard interval can be a prefix either cyclic or zero, the two techniques allowing simple scalar equalization in the frequency domain. The symbols obtained are sent on a transmission channel.

FIG. 2 presents the structure of a conventional receiver corresponding to the transmitter illustrated in FIG. 1.

The signal received from the transmission channel is first demodulated with the aid of a module 22 which carries out a synchronization between the clocks of the sender and receiver, removes the guard interval and applies a fast Fourier transformation (FFT) to the signal received.

Using vector and matrix notation, it is possible to write the signal received, after removing the guard interval and applying the FFT:

$$r = H \cdot C\sqrt{Pa} + n_b \quad (1)$$

where n is the noise vector of dimension N×1, N being the number of sub-carriers, $n_b$ containing the samples of complex Gaussian noise iid (independent and identically distributed) of variance $\sigma^2$, H is the diagonal matrix of dimension N×N representing the channel where the diagonal coefficient $h(i) = h(z = e^{j2\Pi i/N})$ (where $$h(z) = \sum_{n=0}^{N-1} g_n \cdot z^{-n},$$

$g_n$ being the value of the $n^{th}$ sample of the impulse response of the propagation channel) represents the coefficient of the channel for the $i^{th}$ sub-carrier, P is a diagonal matrix of dimension K×K containing the powers applied to each of the spreading codes, a and C are respectively the vector of symbols transmitted of dimension N×1 and the matrix of spreading codes of dimension N×K, where the $k^{th}$ column ($1 \leq k \leq K$) represents the code $\{c_{k,l}\}$ of user k.

Thereafter, the frequency response of the channel is estimated for each sub-carrier, in a module 24. These estimates $\hat{H}$ are used jointly with the spreading codes so as to carry out a linear equalization of the symbols received, in a module 26.

In the case of a mono-user detection, a linear equalizer $g_k = (g_{k,1}, \ldots, g_{k,N})^T$ followed by a despreading by the code of user k is applied to the vector received r so as to provide an estimate of the transmitted symbol a(k) for user k:

$$y_k = c_k^H g_k^H r \text{ where } c_k = \{c_{k,l}\}, 1 \leq k \leq K, 1 \leq l \leq N \quad (2)$$

The purpose of the mono- or multi-user equalizer is to reshape the signal received so that it corresponds as closely as possible to the points of the reference constellation. Nevertheless, in the presence of noise (thermal and multiple access), the points retrieved do not coincide exactly with the initial constellation. This is why, after equalization, a soft I/Q demodulation is carried out, in a module 28, before decoding the signal in a channel decoding module 30.

The I/Q demodulation operation consists in retrieving the binary values from the complex symbols arising from the linear detector. When using a channel decoder with soft inputs, the optimal values to be injected into the channel decoder are soft values, that is to say ones that are not directly hard values "0" and "1".

Thus, if a 16-QAM modulation (4 bits) is used, the soft I/Q demodulation ("soft demapping") will consist in calculating 4 soft values corresponding to the 4 bits of the 16-QAM modulation. The optimal soft values (or metrics) to be injected into the channel decoder correspond to a likelihood ratio logarithm (LLR).

The LLR associated with bit $b_{I,q}$ may be written:

$$LLR(b_{I,q}) = \ln \frac{\sum_{\lambda \in S_{I,q}^{(1)}} Pr[a(k) = \lambda \mid r]}{\sum_{\lambda \in S_{I,q}^{(0)}} Pr[a(k) = \lambda \mid r]} \quad (3)$$

where the sign Pr denotes probability and:

$b_{I,q}$ corresponds to a user k and ought to be written $b_{I,q,k}$ but for simplicity the index k is omitted in the remainder of the description, for bit $b_{I,q}$, the QAM constellation is split into two complementary partitions of complex symbols, respectively $S_{I,q}^{(0)}$ containing the symbols with a "0" in the position (I,q) and $S_{I,q}^{(0)}$ containing the symbols with a "1" in the position (I,q). The same procedure is applicable to the bit for the quadrature part $b_{Q,q}$.

the $\lambda$ are the reference symbols of the QAM constellation. For example, $\lambda = \{1+i, 1-i, -1+i, -1-i\}$ for the 4-QAM constellation, well known to the person skilled in the art.

Using Bayes' theorem and making the assumption that the symbols transmitted are distributed equiprobably, the LLR can be expressed as follows:

$$LLR(b_{I,q}) = \ln \frac{\sum_{\lambda \in S_{I,q}^{(1)}} Pr[r \mid a(k) = \lambda]}{\sum_{\lambda \in S_{I,q}^{(0)}} Pr[r \mid a(k) = \lambda]} \quad (4)$$

In equation (4), the numerator of the logarithm sums the probabilities for all the symbols having a "1" for the bit in position q and the denominator sums the probabilities for all the symbols having a "0" for the bit in position q. These probabilities are exponentially decreasing functions of the Euclidian distance between the symbols received and the reference symbols $\lambda$.

This distance is weighted by a term which will be detailed later and which forms the subject of the invention. The result is a soft value indicating the degree of confidence with respect to a given bit $b_{I,q}$, where a positive value indicates a binary "1" while a negative value indicates a binary "0".

After the soft demodulation operation is the decoding process which carries out the dual operations of those performed by the coder on transmission. If bit puncturing and interleaving operations are present on transmission, this being the case if convolutional codes or turbocodes are employed, the bit deinterleaving followed by depuncturing operations are therefore carried out after the soft I/Q demodulation. The channel decoding makes it possible finally to retrieve the binary data sent. For example, in the case where a convolutional coder is used on transmission, the channel decoding uses the branch metric calculation, which calls upon the LLR given by equation (4). The branch metric for the state s(i) of the path i at the instant t may be written:

$$M_t^{s(i)} = M_{t-1}^{s'(i)} + \sum_{n=1}^{N} (x_{t,n}^{s(i)} q_{t,n} LLR(b_n)) \quad (5)$$

where $M_{t-1}^{s'(i)}$ represents the previous branch metric, $x_{t,n}^{s(i)}$ represents a theoretical transmitted coded bit (according to a trellis diagram) for a coder of rate 1/N, $q_{t,n}$ represents the puncturing pattern and $LLR(b_n)$ represents the LLR of the coded bit transmitted.

A calculation of the LLR commonly applied for an MC-CDMA system ("Multi-Carrier—Code Division Multiple Access") with binary orthogonal spreading codes is known, obtained from equation (4) above.

The $i^{th}$ symbol of complex data received for user k after a mono-user detection is expressed in the following form, if it is considered that the data item was transmitted and spread on N sub-carriers:

$$y_k = \quad (6)$$

$$a_k \sqrt{p_k} \sum_{l=0}^{N-1} |c_{k,l}|^2 g_{k,l} h_l + \sum_{\substack{i=0 \\ i \neq k}}^{K-1} \sqrt{p_i} \sum_{l=0}^{N-1} g_{k,l} h_l c_{k,l}^* c_{i,l} a_i + \sum_{l=0}^{N-1} g_{k,l} c_{k,l}^* n_l$$

where $P_k$ and $P_i$ are parameters representative of the powers applied respectively to the $k^{th}$ and to the $i^{th}$ users, $c_{k,l}$ is the value of the spreading code for the $l^{th}$ sub-carrier and the user k, $g_{k,l}$ is the value of linear equalization coefficient associated with the $l^{th}$ sub-carrier and with the user k, $h_l$ is the coefficient of the transmission channel for the $l^{th}$ sub-carrier, $n_l$ is the noise associated with the $l^{th}$ sub-carrier and the sign * denotes the complex conjugate.

If Walsh-Hadamard spreading codes are considered, these being real orthogonal codes taking the binary values $c_{k,l} = \pm 1$, we obtain:

$$y_k = a_k \sqrt{p_k} \sum_{l=0}^{N-1} g_{k,l} h_l + \sum_{\substack{i=0 \\ i \neq k}}^{K-1} \sqrt{p_i} \sum_{l=0}^{N-1} g_{k,l} h_l c_{i,l} c_{k,l} a_i + \sum_{l=0}^{N-1} g_{k,l} c_{k,l} n_l \quad (7)$$

A known way of obtaining the exact expression for the LLR of binary spreading codes is now described.

When a frequency interleaver is applied, the complex coefficients $h_l$ of the channel affecting the data symbols ak may be considered to be independent. Thus, for sufficiently long spreading codes (N≧8), the noise and complex multiple access interference (MAI) terms may be approximated by complex Gaussian additive noise (according to the central limit theorem) of zero mean and with variance:

$$\sigma_{MAI}^2 \approx 2(K-1)(E[|g_{k,l}h_l|^2] - |E[g_{k,l}h_l]|^2) \text{ and} \tag{8}$$

$$\sigma_{noise}^2 \approx N\sigma^2 E[|g_{k,l}|^2]$$

$$\sigma_{MAI}^2 \approx 2\left(\sum_{\substack{i=0 \\ i \neq k}}^{K-1} p_i\right)(E[|g_{k,l}h_l|^2] - |E[g_{k,l}h_l]|^2) \text{ and} \tag{9}$$

$$\sigma_{noise}^2 \approx N\sigma^2 E[|g_{k,l}|^2]$$

Equation (8) corresponds to the case where all the users have an identical power and equation (9) corresponds to the generalization to the case where the users have different powers.

The law of large numbers makes it possible to evaluate the mathematical expectations by replacing the expectations by the empirical mean of the terms considered. Consequently, if $N \geq 8$, the variances for the noise and MAI terms may be formulated as follows, respectively for identical powers and for different powers:

$$\sigma_{MAI}^2 \approx 2(K-1)\left(\frac{1}{N}\sum_{l=0}^{N-1}|g_{k,l}\hat{h}_l|^2 - \frac{1}{N^2}\left|\sum_{l=0}^{N-1}g_{k,l}\hat{h}_l\right|^2\right) \text{ and} \tag{10}$$

$$\sigma_{noise}^2 \approx \sigma^2 \sum_{l=0}^{N-1}|g_{k,l}|^2$$

$$\sigma_{MAI}^2 \approx 2\left(\sum_{\substack{i=0 \\ i \neq k}}^{K-1} p_i\right)\left(\frac{1}{N}\sum_{l=0}^{N-1}|g_{k,l}\hat{h}_l|^2 - \frac{1}{N^2}\left|\sum_{l=0}^{N-1}g_{k,l}\hat{h}_l\right|^2\right) \text{ and} \tag{11}$$

$$\sigma_{noise}^2 \approx \sigma^2 \sum_{l=0}^{N-1}|g_{k,l}|^2$$

where $\hat{h}_l$ is the estimate of $h_l$ originating from the channel estimation module 24.

The LLR to be used as input to the channel decoder in the case of a M-QAM modulation may then be written, using equation (4):

$$LLR(b_{I,q}) = \ln \frac{\sum_{\lambda \in S_{I,q}^{(1)}} \exp\left(-\frac{1}{2}\frac{\left|y_k - \lambda\sqrt{p_k}\sum_{l=0}^{N-1}g_{k,l}\hat{h}_l\right|^2}{\sigma_{noise}^2 + \sigma_{MAI}^2}\right)}{\sum_{\lambda \in S_{I,q}^{(0)}} \exp\left(-\frac{1}{2}\frac{\left|y_k - \lambda\sqrt{p_k}\sum_{l=0}^{N-1}g_{k,l}\hat{h}_l\right|^2}{\sigma_{noise}^2 + \sigma_{MAI}^2}\right)} \tag{12}$$

The same relation applies for the bits of the quadrature pathway.

From equation (12) may be obtained the exact formula for a 4-QAM modulation generalized to the case of different powers:

$$LLR(b_{I,q}) = \frac{4\sqrt{p_k}\left|\sum_{l=0}^{N-1}g_{k,l}\hat{h}_l\right|}{\sigma_{MAI}^2 + \sigma_{noise}^2} y_{k,I} \tag{13}$$

where $y_{k,I}$ corresponds to the real part of the complex symbol received after equalization and despreading. The same relation applies for the imaginary part.

It is also known how to obtain simplified versions of the LLR.

For 4-QAM, for large spreading factors, the calculation performed in equation (13) may be simplified as follows:

$$LLR(b_{I,q}) \approx 4\frac{\sqrt{p_k}}{\sigma^2} y_{k,I} \tag{14}$$

Indeed, for large spreading factors, the weighting term $y_{k,I}$ becomes almost constant and therefore has no effect on the soft-input decoding process.

For small spreading factors, the simplification through equation (14) gives markedly worse results than for large spreading factors, because the central limit theorem is no longer satisfied. An approach giving results similar to those of equation (13) even using an MMSE ("Minimum Mean Square Error") mono-user equalization consists in weighting the symbol received in the following manner:

$$LLR(b_{I,q}) \approx \left(4\frac{\sqrt{p_k}}{\sigma^2}\frac{1}{N}\sum_{l=0}^{N-1}|\hat{h}_l|\right)y_{k,I} \tag{15}$$

Useful reference may be made in this regard to the article by Stefan KAISER entitled "Trade-off between Channel Coding and Spreading in Multi-Carrier CDMA Systems" published in Proceedings IEEE Fourth International Symposium on Spread Spectrum Techniques & Applications (ISSSTA'96), Mainz, Germany, pages 1366 to 1370, September 1996.

In practice, formula (15) is preferable to equation (13) when using a mono-user MMSE equalizer, since the computational complexity is reduced without any significant loss of performance. However, it should be noted that equation (15) gives markedly worse results than equation (13) for MRC ("Maximum Ratio Combining") and ZF ("Zero Forcing") equalizers, but not for the EGC ("Equal Gain Combining") equalizer.

It is also known how to obtain a simplified expression for the LLR for square modulations of higher order with no CSI ("Channel State Information").

In the exact equation (13) or simplified equation (15), the state of the channel is present in the LLR by virtue of the terms using the values $h_l$ or $g_l$. These terms represent the CSI.

In an article entitled "Simplified Soft-Output Demapper for Binary Interleaved COFDM with Application to HIPERLAN/2" published in IEEE International Conference on Communications ICC 2002, pages 664 to 668, volume 2, F. TOSATO and P. BISAGLIA have proposed a simplification for calculating the LLR for square M-QAM constellations for the COFDM (Coded OFDM) systems only, with no CSI.

If $y_k = y_{k,I} + i \cdot y_{k,Q}$ denotes the complex QAM symbol received and equalized for user k, the following LLRs are obtained if the CSI are ignored:

For a 16-QAM with I={$b_{I,1}$, $b_{I,2}$} and Q={$b_{Q,1}$, $b_{Q,2}$}:

for the part I:

$LLR(b_{I,1}) = y_{k,I}$ $LLR(b_{I,2}) = -|y_{k,I}| + 2$ for the part Q:
LLR($b_{Q,1}$)=$y_{k,Q}$
LLR($b_{Q,2}$)=−|$y_{k,Q}$|+2
for a 64-QAM with $$I=\{b_{I,1}, b_{I,2}, b_{I,3}\} \text{ and } Q=\{b_{Q,1}, b_{Q,2}, b_{Q,3}\}: \quad (16)$$

for the part I:
LLR($b_{I,1}$)=$y_{k,I}$
LLR($b_{I,2}$)=−|$y_{k,I}$|+4
LLR($b_{I,3}$)=−||$y_{k,I}$|−4|+2
for the part Q:
LLR($b_{Q,1}$)=$y_{k,Q}$
LLR($b_{Q,2}$)=−|$y_{k,Q}$|+4
LLR($b_{Q,3}$)=−|$y_{k,Q}$|−4|+2

A generic formulation applied to the COFDM for square M-QAM modulations (M>4) is also given in the aforesaid article by F. TOSATO and P. BISAGLIA, namely (the same relations apply for the quadrature part):

$$LLR(b_{I,q}) = M_{I,q} \quad (17)$$

where:

$M_{I,q} = y_{k,I}$ for $q=1$ $M_{I,q} = -|M_{I,q-1}| + m_{I,q}$ for $q>1$ \quad (18)

where $m_{I,q}$ corresponds to half the distance between the boundaries of the partition relating to $b_{I,q}$. For example, for the 16-QAM modulation, $m_{I,2}=2$ since the distance between the two boundaries equals 4.

The procedures presented in the prior art for calculating optimal LLRs or simplified versions of the LLRs have, on the one hand, the drawback of relying on the assumption that the CDMA spreading codes are binary sequences of +1 and −1 and, moreover, these procedures may lead to degradations in the performance of OFDM-CDMA transmission systems using nonbinary codes.

SUMMARY

The aim of the invention is to remedy the drawbacks of the prior art, by optimizing the metric to be injected as input to a channel decoder in an OFDM-CDMA system using nonbinary orthogonal spreading codes.

The invention finds an application in particular in the field of telecommunications, for communication systems utilizing the OFDM-CDMA technique, such as for example the multiband OFDM Alliance system.

With this aim, the present invention proposes a method of soft demodulation of data modulated according to a square quadrature amplitude modulation of order greater than or equal to 4, in a communication system implementing a multicarrier code division multiple access or OFDM-CDMA technique, using non-binary spreading codes, remarkable in that it comprises steps consisting in determining:

a simplified expression for the logarithm of the likelihood ratio LLR($b_{I/q}$) for the in-phase pathway for the user k according to the equation:

$$LLR(b_{I,q}) = \left(4 \frac{\sqrt{p_k}}{\sigma^2} \frac{1}{N} \sum_{l=0}^{N-1} |c_{k,l}|^2 |\hat{h}_l|\right) \cdot M_{I,q}$$

where $M_{I,q} = y_{k,I}$ for $q=1$ $M_{I,q} = -|M_{I,q-1}| + m_{I,q}$ for $q>1$ where $m_{I,q}$ corresponds to half the distance between the boundaries of the partition relating to $b_{I,q}$ and where:

$p_k$ is a parameter representative of the power applied to the $k^{th}$ user, $\sigma^2$ is the variance of the noise, N is the number of sub-carriers, l is an index (positive integer) representative of the sub-carrier ($1 \leq l \leq N$), $c_{k,l}$ is the value of the spreading code for the $l^{th}$ sub-carrier and user k, $\hat{h}_l$ is the estimate of the coefficient of the transmission channel for the $l^{th}$ sub-carrier, $y_{k,l}$ corresponds to the real part of the complex symbol after equalization and despreading intended to be demodulated,
and
a simplified expression for the logarithm of the likelihood ratio LLR($b_{Q,q}$) for the quadrature pathway for the user k in accordance with the equation:

$$LLR(b_{Q,q}) = \left(4 \frac{\sqrt{p_k}}{\sigma^2} \frac{1}{N} \sum_{l=0}^{N-1} |c_{k,l}|^2 |\hat{h}_l|\right) \cdot M_{Q,q}$$

where $M_{Q,q} = y_{k,Q}$ for $q=1$ $M_{Q,q} = -|M_{Q,q-1}| + m_{Q,q}$ for $q>1$ where $m_{Q,q}$ corresponds to half the distance between the boundaries of the partition relating to $b_{Q,q}$ and where:

$y_{k,Q}$ corresponds to the imaginary part of the complex symbol after equalization and despreading intended to be demodulated.

The simplified metric proposed is particularly appropriate in the case of short spreading factors, which gives a suboptimal decoding but which guarantees low complexity of implementation for a negligible loss of performance.

When the data are modulated according to a 4-QAM modulation, the simplified expression for the logarithm of the likelihood ratio LLR($b_{I,q}$) for the bits $b_{I,q}$ of the in-phase pathway for the user k is given by the following equation:

$$LLR(b_{I,q}) = \left(4 \frac{\sqrt{p_k}}{\sigma^2} \frac{1}{N} \sum_{l=0}^{N-1} |c_{k,l}|^2 |\hat{h}_l|\right) y_{k,I}$$

where $y_{k,I}$ corresponds to the real part of the complex symbol received after equalization and despreading, and the simplified expression for the logarithm of the likelihood ratio LLR($b_{Q,q}$) for the bits $b_{Q,q}$ of the quadrature pathway for the user k is given by the following equation:

$$LLR(b_{Q,q}) = \left(4 \frac{\sqrt{p_k}}{\sigma^2} \frac{1}{N} \sum_{l=0}^{N-1} |c_{k,l}|^2 |\hat{h}_l|\right) y_{k,Q}$$

where $y_{k,Q}$ corresponds to the imaginary part of the complex symbol received after equalization and despreading.

This also makes it possible to obtain an appreciable improvement in the binary error rate of the system.

The present invention finds a favored application within the framework of the standard proposed by the MBOA (Multi-Band OFDM Alliance) consortium.

In a particular embodiment such as this, the logarithm of the likelihood ratio of the bits of the in-phase and quadrature pathways for the bits $b_{m(n)}$, $b_{m(n)+50}$, $b_{m(n)+1}$, $b_{m(n)+51}$ is given by the following equations:

$$\begin{bmatrix} LLR(b_{m(n)}) \\ LLR(b_{m(n)+50}) \end{bmatrix} =$$

$$\frac{4g_n\hat{h}_n + g_{n+50}\hat{h}_{n+50}}{2(g_n\hat{h}_n - g_{n+50}\hat{h}_{n+50})^2 + \sqrt{5}\,\hat{\sigma}^2(4|g_n|^2 + |g_{n+50}|^2)} \begin{bmatrix} y_{n,I} \\ y_{n,Q} \end{bmatrix}$$

$$\begin{bmatrix} LLR(b_{m(n)+1}) \\ LLR(b_{m(n)+51}) \end{bmatrix} =$$

$$\frac{g_n\hat{h}_n + 4g_{n+50}\hat{h}_{n+50}}{2(g_n\hat{h}_n - g_{n+50}\hat{h}_{n+50})^2 + \sqrt{5}\,\hat{\sigma}^2(|g_n|^2 + 4|g_{n+50}|^2)} \begin{bmatrix} y_{n+50,I} \\ y_{n+50,Q} \end{bmatrix}$$

where:

m(n)=2n for n=0, 1, 2, . . . , 24 and m(n)=2n+50 for n=25, 26, . . . , 49, $y_{n,I}$ and $y_{n+50,I}$ are the real parts of the complex symbols received after equalization and despreading corresponding respectively to the two complex 4-QAM symbols transmitted, $y_{n,Q}$ and $y_{n+50,Q}$ are the imaginary parts of the complex symbols received after equalization and despreading corresponding respectively to the two complex 4-QAM symbols transmitted, $g_n$ and $g_{n+50}$ are the two equalization coefficients employed, $\hat{h}_n$ and $\hat{h}_{n+50}$ are the estimates of the values of the frequency response of the transmission channel on the two sub-carriers, and $\hat{\sigma}^2$ is the estimate of the variance of the noise.

The simplified expression for the likelihood ratio of the bits of the in-phase and quadrature pathways for the user k is given by the following equations:

$$\begin{bmatrix} LLR(b_{m(n)}) \\ LLR(b_{m(n)+50}) \end{bmatrix} = (4|\hat{h}_n| + |\hat{h}_{n+50}|) \cdot \begin{bmatrix} y_{n,I} \\ y_{n,Q} \end{bmatrix}$$

$$\begin{bmatrix} LLR(b_{m(n)+1}) \\ LLR(b_{m(n)+51}) \end{bmatrix} = (|\hat{h}_n| + 4|\hat{h}_{n+50}|) \cdot \begin{bmatrix} y_{n+50,I} \\ y_{n+50,Q} \end{bmatrix}$$

where:

m(n)=2n for n=0, 1, 2, . . . , 24 and m(n)=2n+50 for n=25, 26, . . . , 49, $y_{n,I}$ and $y_{n+50,I}$ are the real parts of the complex symbols received after equalization and despreading corresponding respectively to the two complex 4-QAM symbols transmitted, $y_{n,Q}$ and $y_{n+50,Q}$ are the imaginary parts of the complex symbols received after equalization and despreading corresponding respectively to the two complex 4-QAM symbols transmitted, and $\hat{h}_n$ and $\hat{h}_{n+50}$ are the estimates of the values of the frequency response of the transmission channel on the two sub-carriers.

With the same aim as that indicated above, the present invention also proposes a device of soft demodulation of data modulated according to a square quadrature amplitude modulation of order greater than or equal to 4, in a communication system implementing a multi-carrier code division multiple access or OFDM-CDMA technique, using non-binary spreading codes, remarkable in that it comprises means for determining:

a simplified expression for the logarithm of the likelihood ratio $LLR(b_{I,q})$ for the in-phase pathway for the user k according to the equation:

$$LLR(b_{I,q}) = \left(4\frac{\sqrt{p_k}}{\sigma^2}\frac{1}{N}\sum_{l=0}^{N-1}|c_{k,l}|^2\,|\hat{h}_l|\right) \cdot M_{I,q}$$

where $M_{I,q} = y_{k,I}$ for q=1

$M_{I,q} = -|M_{I,q-1}| + m_{I,q}$ for q>1 where $m_{I,q}$ corresponds to half the distance between the boundaries of the partition relating to $b_{I,q}$ and where:

$p_k$ is a parameter representative of the power applied to the $k^{th}$ user, $\sigma^2$ is the variance of the noise, N is the number of sub-carriers, l is an index (positive integer) representative of the sub-carrier ($1 \leq l \leq N$), $c_{k,l}$ is the value of the spreading code for the $l^{th}$ sub-carrier and the user k, $\hat{h}_l$ is the estimate of the coefficient of the transmission channel for the $l^{th}$ sub-carrier, $y_{k,I}$ corresponds to the real part of the complex symbol after equalization and despreading intended to be demodulated, and a simplified expression for the logarithm of the likelihood ratio $LLR(b_{Q,q})$ for the quadrature pathway for the user k in accordance with the equation:

$$LLR(b_{Q,q}) = \left(\frac{4\sqrt{p_k}}{\sigma^2}\frac{1}{N}\sum_{l=0}^{N-1}|c_{k,l}|^2\,|\hat{h}_l|\right) \cdot M_{Q,q}$$

where $M_{Q,q} = y_{k,Q}$ for q=1

$M_{Q,q} = -|M_{Q,q-1}| + m_{Q,q}$ for q>1 where $m_{Q,q}$ corresponds to half the distance between the boundaries of the partition relating to $b_{Q,q}$ and where:

$y_{k,Q}$ corresponds to the imaginary part of the complex symbol after equalization and despreading intended to be demodulated.

The invention is also directed at a receiver adapted for implementing a method as described above.

The invention is also directed at a receiver comprising a device such as above.

The particular characteristics and the advantages of the device and of the receiver being similar to those of the method, they are not repeated here.

BRIEF DESCRIPTION OF THE DRAWINGS

Other aspects and advantages of the invention will become apparent on reading the detailed description which follows of particular embodiments, given by way of nonlimiting examples. The description refers to the drawings which accompany it, in which.

DETAILED DESCRIPTION

Throughout what follows, consideration is given to an OFDM-CDMA transmitter using nonbinary orthogonal spreading codes.

Figure 1:
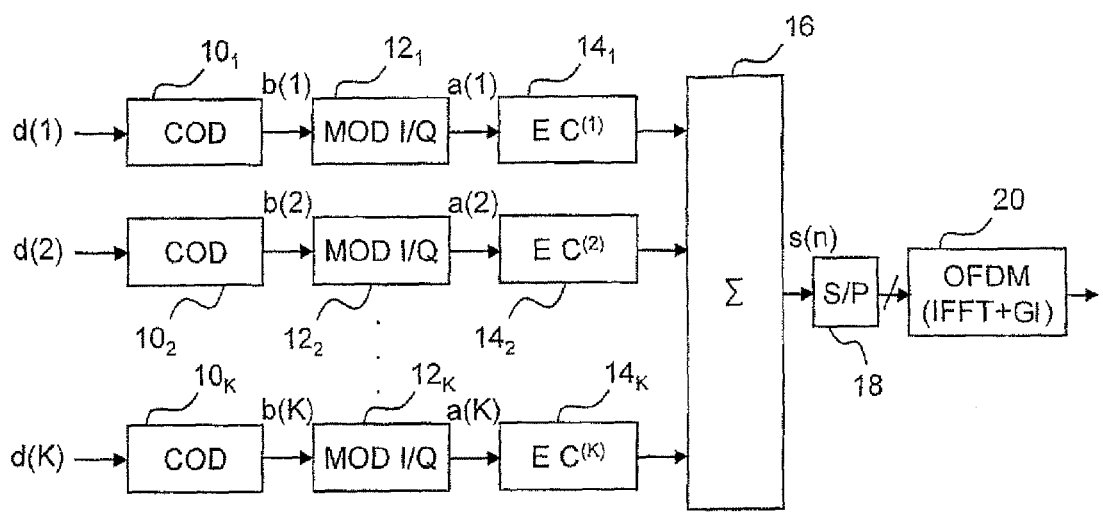
FIG. 1, already described, represents diagrammatically an OFDM-CDMA transmitter with channel coding of conventional type.
Figure 2:
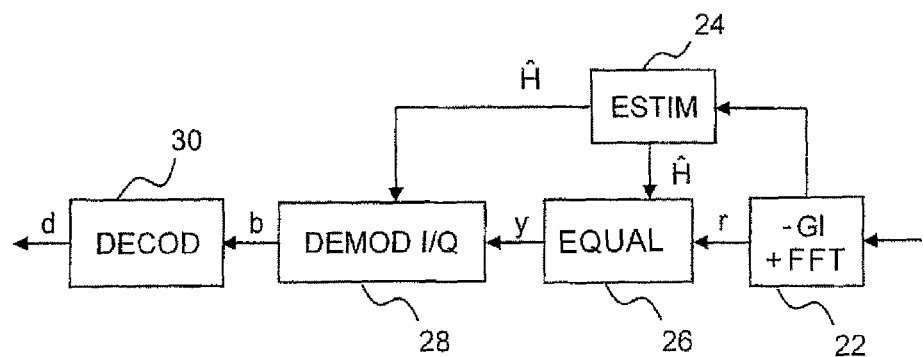
FIG. 2, already described, represents diagrammatically a receiver of conventional type corresponding to a transmitter of the type illustrated in FIG. 1.
Figure 3:
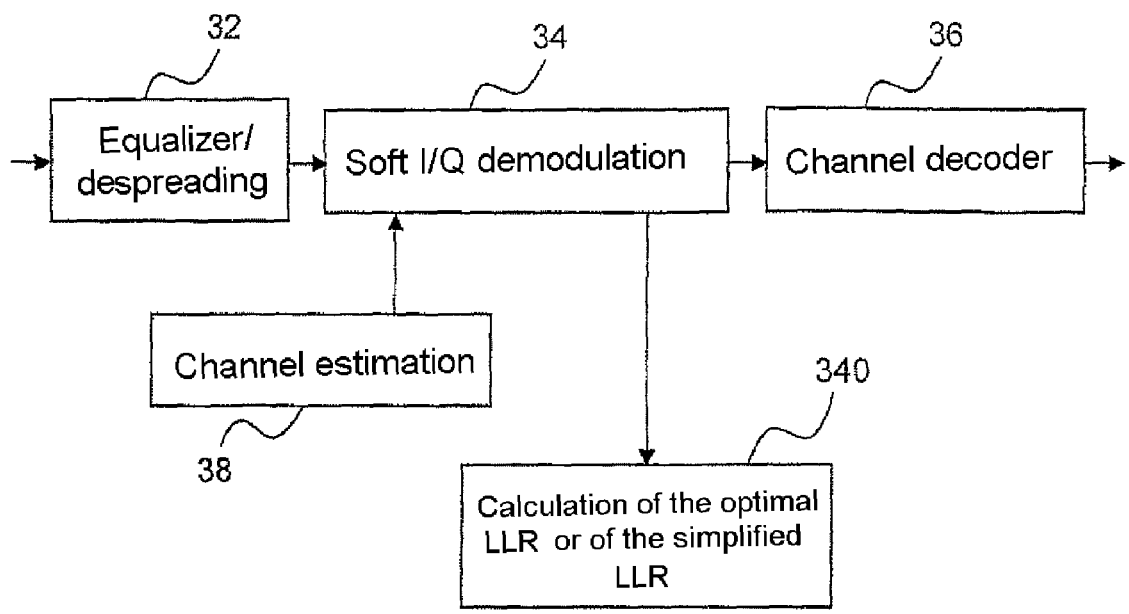
FIG. 3 represents diagrammatically a part of a receiver capable of implementing a method in accordance with the present invention, in a particular embodiment.

It is recalled that the logarithm of the likelihood ratio (LLR) makes it possible to go from complex symbols (I pathway and Q pathway) originating from an equalizer, such as the equalization/despreading module 32 represented in FIG. 3, to real values (one per bit) indicating the reliability of the bit received before entering a channel decoder such as the channel decoder 36.

The LLR therefore carries out what is called a soft I/Q demodulation operation 340, in a soft I/Q demodulation module 34.

This demodulation operation intervenes between the channel equalization/despreading and decoding processes. The soft I/Q demodulation process, or calculation of soft decisions on input to the decoder, uses the data arising from the channel estimation, performed by a channel estimation module 38, and from the equalization performed by the module 32.

The output of the soft I/Q demodulation module 34 corresponds to the LLR injected as input to the channel decoder 36.

In accordance with the present invention, the same calculations as those presented in the introduction may be conducted as far as equation (6) describing the ith complex data symbol received for the user k after a mono-user detection:

$$y_k = a_k \sqrt{p_k} \sum_{l=0}^{N-1} |c_{k,l}|^2 g_{k,l} h_l + \sum_{\substack{i=0 \\ i \neq k}}^{K-1} \sqrt{p_i} \sum_{l=0}^{N-1} g_{k,l} h_l c_{k,l}^* c_{i,l} a_i + \sum_{l=0}^{N-1} g_{k,l} c_{k,l}^* n_l$$

A nonlimiting example of nonbinary real and orthogonal spreading codes is given by the following code matrix:

$$\frac{1}{\sqrt{5}} \begin{bmatrix} 2 & 1 \\ 1 & -2 \end{bmatrix} \quad (19)$$

When a frequency interleaver is applied, the complex coefficients $h_l$ of the channel affecting the data symbols $a_k$ may be considered to be independent. Thus, for sufficiently long spreading codes (where the number of sub-carriers N is greater than or equal to 8), the noise and complex multiple access interference (MAI) terms may be approximated by complex Gaussian additive noise (according to the central limit theorem) of zero mean and with variance:

$$\sigma_{MAI}^2 \approx 2(K-1)(E[|c_{k,l}^* c_{i,l} g_{k,l} h_l|^2] - |E[c_{k,l}^* c_{i,l} g_{k,l} h_l]|^2) \quad (20)$$

$$\text{and } \sigma_{noise}^2 \approx N\sigma^2 E[|c_{k,l}^* g_{k,l}|^2]$$

$$\sigma_{MAI}^2 \approx 2\left(\sum_{\substack{i=0 \\ i \neq k}}^{K-1} p_i\right)(E[|c_{k,l}^* c_{i,l} g_{k,l} h_l|^2] - |E[c_{k,l}^* c_{i,l} g_{k,l} h_l]|^2) \quad (21)$$

$$\text{and } \sigma_{noise}^2 \approx N\sigma^2 E[|c_{k,l}^* g_{k,l}|^2]$$

Equation (20) corresponds to the case where all the users have an identical power and equation (21) corresponds to the generalization to the case where the users have different powers.

The law of large numbers makes it possible to evaluate the mathematical expectations by replacing the expectations by the empirical mean of the terms considered. Consequently, if $N \geq 8$, the variances for the noise and MAI terms may be formulated as follows, respectively for identical powers (equation (22)) and for different powers (equation (23)):

$$\sigma_{MAI}^2 \approx 2(K-1)\left(\frac{1}{N}\sum_{l=0}^{N-1}|c_{k,l}^* c_{i,l} g_{k,l} \hat{h}_l|^2 - \frac{1}{N^2}\left|\sum_{l=0}^{N-1} c_{k,l}^* c_{i,l} g_{k,l} \hat{h}_l\right|^2\right) \quad (22)$$

$$\text{and } \sigma_{noise}^2 \approx \sigma^2 \sum_{l=0}^{N-1}|c_{k,l}^* g_{k,l}|^2$$

$$\sigma_{MAI}^2 \approx 2\left(\sum_{\substack{i=0 \\ i \neq k}}^{K-1} p_i\right)\left(\frac{1}{N}\sum_{l=0}^{N-1}|c_{k,l}^* c_{i,l} g_{k,l} \hat{h}_l|^2 - \frac{1}{N^2}\left|\sum_{l=0}^{N-1} c_{k,l}^* c_{i,l} g_{k,l} \hat{h}_l\right|^2\right) \quad (23)$$

$$\text{and } \sigma_{noise}^2 \approx \sigma^2 \sum_{l=0}^{N-1}|c_{k,l}^* g_{k,l}|^2$$

where $\hat{h}_l$ is the estimate of $h_l$ originating from the channel estimation module.

The LLR to be used as input to the channel decoder in the case of a M-QAM modulation may then be written, using equation (4) given in the introduction:

$$LLR(b_{l,q}) = \ln \frac{\sum_{\lambda \in S_{l,q}^{(1)}} \exp\left(-\frac{1}{2} \frac{\left|y_k - \lambda\sqrt{p_k}\sum_{l=0}^{N-1}|c_{k,l}|^2 g_{k,l} \hat{h}_l\right|^2}{\sigma_{noise}^2 + \sigma_{MAI}^2}\right)}{\sum_{\lambda \in S_{l,q}^{(0)}} \exp\left(-\frac{1}{2} \frac{\left|y_k - \lambda\sqrt{p_k}\sum_{l=0}^{N-1}|c_{k,l}|^2 g_{k,l} \hat{h}_l\right|^2}{\sigma_{noise}^2 + \sigma_{MAI}^2}\right)} \quad (24)$$

where:

$\lambda$ is a reference symbol of the constellation associated with the quadrature amplitude modulation, $S_{l,q}^{(0)}$ and $S_{l,q}^{(1)}$ are two complementary partitions of complex symbols containing respectively the symbols of the constellation with a "0" in position (I, q) and the symbols of the constellation with a "1" in position (I, q), $y_k$ corresponds to the complex symbol after equalization and despreading intended to be demodulated, $p_k$ is a parameter representative of the power applied to the $k^{th}$ user, N is the number of sub-carriers, l is an index (positive integer) representative of the sub-carrier ($1 \leq l \leq N$), $c_{k,l}$ is the value of the spreading code for the $l^{th}$ sub-carrier and user k, $g_{k,l}$ is the value of the linear equalization coefficient associated with the $l^{th}$ sub-carrier and with the user k, $\hat{h}_l$ is the estimate of the coefficient of the transmission channel for the $l^{th}$ sub-carrier, $\sigma_{noise}^2$ is the variance of the noise, and $\sigma_{MAI}^2$ is the variance of the complex multiple access interference.

The same relation applies for the quadrature pathway, namely:

$$LLR(b_{Q,q}) = \ln \frac{\sum_{\lambda \in S_{Q,q}^{(1)}} \exp\left(-\frac{1}{2} \frac{\left|y_k - \lambda \sqrt{p_k} \sum_{l=0}^{N-1} |c_{k,l}|^2 g_{k,l} \hat{h}_l\right|^2}{\sigma_{noise}^2 + \sigma_{MAI}^2}\right)}{\sum_{\lambda \in S_{Q,q}^{(0)}} \exp\left(-\frac{1}{2} \frac{\left|y_k - \lambda \sqrt{p_k} \sum_{l=0}^{N-1} |c_{k,l}|^2 g_{k,l} \hat{h}_l\right|^2}{\sigma_{noise}^2 + \sigma_{MAI}^2}\right)}$$

where:

$S_{Q,q}^{(0)}$ and $S_{Q,q}^{(1)}$ are two complementary partitions of complex symbols containing respectively the symbols of the constellation with a "0" in position (Q, q) and the symbols of the constellation with a "1" in position (Q, q).

From equation (24) can be obtained the exact formula for the LLR for a 4-QAM modulation generalized to the case of different powers:

$$LLR(b_{I,q}) = \frac{4\sqrt{p_k} \left|\sum_{l=0}^{N-1} |c_{k,l}|^2 g_{k,l} \hat{h}_l\right|}{\sigma_{MAI}^2 + \sigma_{noise}^2} y_{k,I} \quad (25)$$

where $y_{k,I}$ corresponds to the real part of the complex symbol received after equalization and despreading. The same relation applies for the imaginary part, namely:

$$LLR(b_{Q,q}) = \frac{4\sqrt{p_k} \left|\sum_{l=0}^{N-1} |c_{k,l}|^2 g_{k,l} \hat{h}_l\right|}{\sigma_{MAI}^2 + \sigma_{noise}^2} y_{k,Q}$$

where $y_{k,Q}$ corresponds to the imaginary part of the complex symbol received after equalization and despreading.

However, the exact formula for the LLR given by equation (24) and even its application to the 4-QAM modulation, given by equation (25), may turn out to be difficult to implement in practice: indeed, the two terms, complex multiple access interference and noise, need to be estimated and, to do this, the receiver must be aware of all the active CDMA codes. Moreover, these equations use the law of large numbers to calculate the mathematical expectations, this possibly no longer being valid when the length of the spreading codes becomes relatively small.

This is why the present invention also proposes a simplified expression for the LLRs of an OFDM-CDMA system.

In the case of a 4-QAM modulation, the simplified expression for the LLRs of an OFDM-CDMA system with 4-QAM modulation and with binary codes is weighted to obtain a simplified expression for the LLRs of an OFDM-CDMA system with a 4-QAM modulation and with binary or nonbinary codes:

$$LLR(b_{I,q}) = \frac{4\sqrt{p_k}}{\sigma^2} \frac{1}{N} \left(\sum_{l=0}^{N-1} |c_{k,l}|^2 |\hat{h}_l|\right) y_{k,I} \quad (26)$$

In practice, the formula (26) is preferable to equation (25) when using a mono-user MMSE equalizer, since the computational complexity is reduced with no significant loss of performance.

The present invention also proposes a simplified expression for the LLR for square M-QAM constellations, that is to say ones for $M=2^{2n}$, where n is a strictly positive integer, for MC-CDMA systems with binary or nonbinary spreading codes.

If $y_k = y_{k,I} + i \cdot y_{k,Q}$ denotes the complex QAM symbol received and equalized for user k, the following LLRs are obtained:

For a QAM-16 modulation with $I=\{b_{I,1}, b_{I,2}\}$ and $Q=\{b_{Q,1}, b_{Q,2}\}$:

For the part I:

$$LLR(b_{I,1}) = \left(\frac{4\sqrt{p_k}}{\sigma^2} \frac{1}{N} \sum_{l=0}^{N-1} |c_{k,l}|^2 |\hat{h}_l|\right) \cdot y_{k,I}$$

$$LLR(b_{I,2}) = \left(\frac{4\sqrt{p_k}}{\sigma^2} \frac{1}{N} \sum_{l=0}^{N-1} |c_{k,l}|^2 |\hat{h}_l|\right) \cdot (-|y_{k,I}| + 2)$$

For the part Q:

$$LLR(b_{Q,1}) = \left(\frac{4\sqrt{p_k}}{\sigma^2} \frac{1}{N} \sum_{l=0}^{N-1} |c_{k,l}|^2 |\hat{h}_l|\right) \cdot y_{k,Q}$$

$$LLR(b_{Q,2}) = \left(\frac{4\sqrt{p_k}}{\sigma^2} \frac{1}{N} \sum_{l=0}^{N-1} |c_{k,l}|^2 |\hat{h}_l|\right) \cdot (-|y_{k,Q}| + 2)$$

For a 64-QAM modulation with $I=\{b_{I,1}, b_{I,2}, b_{I,3}\}$ and $Q=\{b_{Q,1}, b_{Q,2}, b_{Q,3}\}$ (27)

For the part I:

$$LLR(b_{I,1}) = \left(\frac{4\sqrt{p_k}}{\sigma^2} \frac{1}{N} \sum_{l=0}^{N-1} |c_{k,l}|^2 |\hat{h}_l|\right) \cdot y_{k,I}$$

$$LLR(b_{I,2}) = \left(\frac{4\sqrt{p_k}}{\sigma^2} \frac{1}{N} \sum_{l=0}^{N-1} |c_{k,l}|^2 |\hat{h}_l|\right) \cdot (-|y_{k,I}| + 4)$$

$$LLR(b_{I,3}) = \left(\frac{4\sqrt{p_k}}{\sigma^2} \frac{1}{N} \sum_{l=0}^{N-1} |c_{k,l}|^2 |\hat{h}_l|\right) \cdot (|-|y_{k,I}| + 4| + 2)$$

For the part Q:

$$LLR(b_{Q,1}) = \left(\frac{4\sqrt{p_k}}{\sigma^2} \frac{1}{N} \sum_{l=0}^{N-1} |c_{k,l}|^2 |\hat{h}_l|\right) \cdot y_{k,Q}$$

-continued $$LLR(b_{Q,2}) = \left(\frac{4\sqrt{p_k}}{\sigma^2} \frac{1}{N} \sum_{l=0}^{N-1} |c_{k,l}|^2 |\hat{h}_l|\right) \cdot (-|y_{k,Q}| + 4)$$

$$LLV(b_{Q,3}) = \left(\frac{4\sqrt{p_k}}{\sigma^2} \frac{1}{N} \sum_{l=0}^{N-1} |c_{k,l}|^2 |\hat{h}_l|\right) \cdot (||-|y_{k,Q}| + 4| + 2)$$

For a square M-QAM modulation for M>4, we obtain (the same relations apply for the quadrature part):

$$LLR(b_{I,q}) = \left(\frac{4\sqrt{p_k}}{\sigma^2} \frac{1}{N} \sum_{l=0}^{N-1} |c_{k,l}|^2 |\hat{h}_l|\right) \cdot M_{I,q} \quad (28)$$

where $$M_{I,q} = y_{k,I} \text{ for } q=1$$

$$M_{I,q} = -|M_{I,q-1}| + m_{I,q} \text{ for } q>1 \quad (29)$$

where $m_{I,q}$ corresponds to half the distance between the boundaries of the partition relating to $b_{I,q}$. For example, for the 16-QAM modulation, $M_{I,2}=2$, since the distance between the two boundaries equals 4.

A favored application of the present invention within the framework of the standard proposed by the MBOA ("Multi-Band OFDM Alliance") consortium is described in what follows.

The optimal and simplified LLR formulae provided by the present invention apply in fact within the framework of this standard, which uses the OFDM technique and which employs Dual-Carrier Modulation (DCM) for its high bit rate transmission modes. The association of DCM and OFDM is entirely equivalent to an OFDM-CDMA transmitter with nonbinary codes, fully laden, using a 4-QAM modulation and a spreading factor of 2.

The input bits are first transformed into bipolar symbols, as follows:

| Input bits $b_n$ | Output symbols $x_n$ |
| --- | --- |
| 0 | −1 |
| 1 | 1 |

Next, these bipolar symbols are grouped into 4's to form 2 complex symbols $s_n$ and $S_{n+50}$, as follows:

$$\begin{bmatrix} s_n \\ s_{n+50} \end{bmatrix} = \frac{1}{\sqrt{10}} \begin{bmatrix} 2 & 1 \\ 1 & -2 \end{bmatrix} \begin{bmatrix} x_{m(n)} + jx_{m(n)+50} \\ x_{m(n)+1} + jx_{m(n)+51} \end{bmatrix} \quad (30)$$

where $x_{m(n)}$, $x_{m(n)+50}$, $x_{m(n)+1}$ and $x_{m(n)+51}$ are the bipolar symbols corresponding to the bits transmitted $b_{m(n)}$, $b_{m(n)+50}$, $b_{m(n)+1}$ and $b_{m(n)+51}$ with:

$$m(n)=2n \text{ for } n=0, 1, 2, \ldots, 24$$

$$m(n)=2n+50 \text{ for } n=25, 26, \ldots, 49 \quad (31)$$

However, it is possible to view this modulation as 2 symbols $a_n$ and $a'_n$ originating from a 4-QAM modulation and then used for a CDMA spreading with nonbinary codes of length 2, by rewriting equation (30) as follows:

$$\begin{bmatrix} s_n \\ s_{n+50} \end{bmatrix} = \frac{1}{\sqrt{5}} \begin{bmatrix} 2 & 1 \\ 1 & -2 \end{bmatrix} \begin{bmatrix} a_n \\ a'_n \end{bmatrix} \quad (32)$$

where $$a_n = \frac{1}{\sqrt{2}} (x_{m(n)} + jx_{m(n)+50})$$

and $$a'_n = \frac{1}{\sqrt{2}} (x_{m(n)+1} + jx_{m(n)+51})$$

are the energy-normalized 4-QAM complex symbols, and $$\frac{1}{\sqrt{5}} \begin{bmatrix} 2 & 1 \\ 1 & -2 \end{bmatrix}$$

is the CDMA matrix with nonbinary spreading codes with a spreading factor of 2.

Let $\hat{h}_n$ and $\hat{h}_{n+50}$ be the estimates of the values of the frequency response of the channel on the 2 sub-carriers modulated respectively by $s_n$ and $S_{n+50}$ and let $g_n$ and $g_{n+50}$ be respectively the 2 equalization coefficients employed.

Let $y_n = y_{n,I} + jy_{n,Q}$ and $y_{n+50} = y_{n+50,I} + jy_{n+50,Q}$ be the complex symbols received after equalization and despreading corresponding respectively to the 4-QAM complex symbols transmitted $a_n$ and $a'_n$.

To obtain the expression for the optimal LLR, it is possible to recalculate equation (6) within the MBOA framework, noting that the powers $p_k$ are all equal (given that the 2 codes are transmitted at the same power) for $y_n$ and $y_{n+50}$:

$$y_n = \frac{1}{5}(4g_n h_n + g_{n+50} h_{n+50})a_n + \quad (33)$$
$$\frac{2}{5}(g_n h_n - g_{n+50} h_{n+50})a'_n + \frac{1}{\sqrt{5}}(2g_n n_n + g_{n+50} n_{n+50})$$

$$y'_n = \frac{1}{5}(g_n h_n + 4g_{n+50} h_{n+50})a'_n + \frac{2}{5}(g_n h_n - g_{n+50} h_{n+50})a_n +$$
$$\frac{1}{\sqrt{5}}(g_n n_n - 2g_{n+50} n_{n+50})$$

Within the framework of the MBOA standard, the CDMA spreading factor is very small, hence the law of large numbers is no longer valid for calculating the mathematical expectations in the two MAI terms of equation (33). One then chooses to take the power of these MAI terms directly. Moreover, whatever equalizer is used (MMSE, MRC, EGC or ZF), the product $g_n \hat{h}_n$ is always real and positive.

In accordance with the present invention, equation (25) yields the following formula for the optimal LLR:

$$\begin{bmatrix} LLR(b_{m(n)}) \\ LLR(b_{m(n)+50}) \end{bmatrix} = \frac{4g_n\hat{h}_n + g_{n+50}\hat{h}_{n+50}}{2(g_n\hat{h}_n - g_{n+50}\hat{h}_{n+50})^2 +} \begin{bmatrix} y_{n,I} \\ y_{n,Q} \end{bmatrix} \quad (34)$$
$$\sqrt{5}\,\hat{\sigma}^2(4|g_n|^2 + |g_{n+50}|^2)$$

$$\begin{bmatrix} LLR(b_{m(n)+1}) \\ LLR(b_{m(n)+51}) \end{bmatrix} = \frac{g_n\hat{h}_n + 4g_{n+50}\hat{h}_{n+50}}{2(g_n\hat{h}_n - g_{n+50}\hat{h}_{n+50})^2 +} \begin{bmatrix} y_{n+50,I} \\ y_{n+50,Q} \end{bmatrix}$$
$$\sqrt{5}\,\hat{\sigma}^2(|g_n|^2 + 4|g_{n+50}|^2)$$

To obtain the simplified LLR, use is made of equation (26) in which the term $$\frac{4\sqrt{p_k}}{\sigma^2}\frac{1}{N}$$

is constant and therefore has no influence on the channel decoding when the channel coder on transmission is of the convolutional type, this being the case for MBO. This therefore yields the following formulae for the simplified LLRs:

$$\begin{bmatrix} LLR(b_{m(n)}) \\ LLR(b_{m(n)+50}) \end{bmatrix} = (4|\hat{h}_n| + |\hat{h}_{n+50}|) \cdot \begin{bmatrix} y_{n,I} \\ y_{n,Q} \end{bmatrix} \quad (35)$$

$$\begin{bmatrix} LLR(b_{m(n)+1}) \\ LLR(b_{m(n)+51}) \end{bmatrix} = (|\hat{h}_n| + 4|\hat{h}_{n+50}|) \cdot \begin{bmatrix} y_{n+50,I} \\ y_{n+50,Q} \end{bmatrix}$$

Experience shows that a significant decrease in the binary error rate (BER) is noted when the formula (35) is applied to the soft bits at the input of the Viterbi decoder of a high bit rate MBO system (480 Mbps). The results obtained are still better when the impulse response of the channel is long, that is to say when the variations in the channel frequency response (represented by the coefficients h in the formulae for the LLR) are greater and where the LLRs therefore afford the decoder still more information about reliability.

The invention claimed is:

1. A method for soft demodulation of data modulated according to a square quadrature amplitude modulation of order greater than or equal to 4, in a communication system implementing a multi-carrier code division multiple access or OFDM-CDMA technique, using non-binary spreading codes, comprising:
determining a simplified expression for a logarithm of a likelihood ratio $LLR(b_{I,q})$ for an in-phase pathway for a user k according to an equation:

$$LLR(b_{I,q}) = \left(\frac{4\sqrt{p_k}}{\sigma^2}\frac{1}{N}\sum_{l=0}^{N-1}|c_{k,l}|^2|\hat{h}_l|\right) \cdot M_{I,q}$$

where $M_{I,q} = y_{k,I}$ for $q=1$ $M_{I,q} = -|M_{I,q-1}| + m_{I,q}$ for $q>1$ where $m_{I,q}$ corresponds to half of a distance between boundaries of a partition relating to $b_{I,q}$ and where:
  $p_k$ is a parameter representative of a power applied to a $k^{th}$ user,
  $\sigma^2$ is a variance of a noise,
  N is a number of sub-carriers,
  l is an index representative of a sub-carrier ($1 \leq l \leq N$), where the index is a positive integer,
  $c_{k,l}$ is a value of a spreading code for a $l^{th}$ sub-carrier and for the user k,
  $\hat{h}_l$ is an estimate of a coefficient of a transmission channel for the $l^{th}$ sub-carrier,
  $y_{k,I}$ corresponds to a real part of a complex symbol after equalization and despreading intended to be demodulated,
and
determining a simplified expression for a logarithm of a likelihood ratio $LLR(b_{Q,q})$ for a quadrature pathway for the user k in accordance with an equation:

$$LLR(b_{Q,q}) = \left(\frac{4\sqrt{p_k}}{\sigma^2}\frac{1}{N}\sum_{l=0}^{N-1}|c_{k,l}|^2|\hat{h}_l|\right) \cdot M_{Q,q}$$

where $M_{Q,q} = y_{k,Q}$ for $q=1$ $M_{Q,q} = -|M_{Q,q-1}| + m_{Q,q}$ for $q>1$ where $m_{Q,q}$ corresponds to half of a distance between boundaries of a partition relating to $b_{Q,q}$ and where:
  $y_{k,Q}$ corresponds to an imaginary part of the complex symbol after equalization and despreading intended to be demodulated.

2. The method according to claim 1, wherein the data are modulated according to a 4-QAM modulation, and wherein the simplified expression for the logarithm of the likelihood ratio $LLR(b_{I,q})$ for bits $b_{I,q}$ of the in-phase pathway for the user k is given by the following equation:

$$LLR(b_{I,q}) = \frac{4\sqrt{p_k}}{\sigma^2}\frac{1}{N}\left(\sum_{l=0}^{N-1}|c_{k,l}|^2|\hat{h}_l|\right)y_{k,I}$$

where $y_{k,I}$ corresponds to the real part of the complex symbol received after equalization and despreading, and the simplified expression for the logarithm of the likelihood ratio $LLR(b_{Q,q})$ for bits $b_{Q,q}$ of the quadrature pathway for the user k is given by the following equation:

$$LLR(b_{Q,q}) = \frac{4\sqrt{p_k}}{\sigma^2}\frac{1}{N}\left(\sum_{l=0}^{N-1}|c_{k,l}|^2|\hat{h}_l|\right)y_{k,Q}$$

where $y_{k,Q}$ corresponds to the imaginary part of the complex symbol received after equalization and despreading.

3. The method according to claim 2, wherein the communication system implements the MBOA (Multi-Band OFDM Alliance) standard.

4. The method according to claim 3, wherein the logarithm of the likelihood ratio of the bits of the in-phase and quadrature pathways for the bits $b_{m(n)}$, $b_{m(n)+50}$, $b_{m(n)+1}$, $b_{m(n)+51}$ is given by the following equations:

$$\begin{bmatrix} LLR(b_{m(n)}) \\ LLR(b_{m(n)+50}) \end{bmatrix} = \frac{4g_n\hat{h}_n + g_{n+50}\hat{h}_{n+50}}{2(g_n\hat{h}_n - g_{n+50}\hat{h}_{n+50})^2 +} \begin{bmatrix} y_{n,I} \\ y_{n,Q} \end{bmatrix}$$
$$\sqrt{5}\,\hat{\sigma}^2(4|g_n|^2 + |g_{n+50}|^2)$$

$$\begin{bmatrix} LLR(b_{m(n)+1}) \\ LLR(b_{m(n)+51}) \end{bmatrix} = \frac{g_n\hat{h}_n + 4g_{n+50}\hat{h}_{n+50}}{2(g_n\hat{h}_n - g_{n+50}\hat{h}_{n+50})^2 +} \begin{bmatrix} y_{n+50,I} \\ y_{n+50,Q} \end{bmatrix}$$
$$\sqrt{5}\,\hat{\sigma}^2(|g_n|^2 + 4|g_{n+50}|^2)$$

where:
m(n)=2n for n=0, 1, 2, ..., 24 and m(n)=2n+50 for n=25, 26, ..., 49, $y_{n,I}$ and $y_{n+50,I}$ are real parts of the complex symbols received after equalization and despreading corresponding respectively to two complex 4-QAM symbols transmitted, $y_{n,Q}$ and $y_{n+50,Q}$ are imaginary parts of the complex symbols received after equalization and despreading corresponding respectively to two complex 4-QAM symbols transmitted, $g_n$ and $g_{n+50}$ are two equalization coefficients employed, $\hat{h}_n$ and $\hat{h}_{n+50}$ are estimates of values of a frequency response of the transmission channel on the two sub-carriers, and $\hat{\sigma}^2$ is an estimate of the variance of the noise.

5. The method according to claim 3, wherein the simplified expression for the likelihood ratio of the bits of the in-phase and quadrature pathways for the bits $b_{m(n)}$, $b_{m(n)+50}$, $b_{m(n)+1}$, $b_{m(n)+51}$ is given by the following equations:

$$\begin{bmatrix} LLR(b_{m(n)}) \\ LLR(b_{m(n)+50}) \end{bmatrix} = (4|\hat{h}_n| + |\hat{h}_{n+50}|) \cdot \begin{bmatrix} y_{n,I} \\ y_{n,Q} \end{bmatrix}$$

$$\begin{bmatrix} LLR(b_{m(n)+1}) \\ LLR(b_{m(n)+51}) \end{bmatrix} = (|\hat{h}_n| + 4|\hat{h}_{n+50}|) \cdot \begin{bmatrix} y_{n+50,I} \\ y_{n+50,Q} \end{bmatrix}$$

m(n)=2n for n=0, 1, 2, ..., 24 and m(n)=2n+50 for n=25, 26, ..., 49, $y_{n,I}$ and $y_{n+50,I}$ are real parts of the complex symbols received after equalization and despreading corresponding respectively to two complex 4-QAM symbols transmitted, $y_{n,Q}$ and $y_{n+50,Q}$ are imaginary parts of the complex symbols received after equalization and despreading corresponding respectively to the two complex 4-QAM symbols transmitted, and $\hat{h}_n$ and $\hat{h}_{n+50}$ are estimates of values of a frequency response of the transmission channel on the sub-carriers.

6. A device for soft demodulation of data modulated according to a square quadrature amplitude modulation of order greater than or equal to 4, in a communication system implementing a multi-carrier code division multiple access or OFDM-CDMA technique, using non-binary spreading codes, comprising:

means for determining a simplified expression for a logarithm of a likelihood ratio $LLR(b_{I,q})$ for an in-phase pathway for a user k according to an equation:

$$LLR(b_{I,q}) = \left(\frac{4\sqrt{p_k}}{\sigma^2} \frac{1}{N} \sum_{l=0}^{N-1} |c_{k,l}|^2 |\hat{h}_l|\right) \cdot M_{I,q}$$

where $M_{I,q} = y_{k,I}$ for q=1

$M_{I,q} = -|M_{I,q-1}| + m_{I,q}$ for $q>1$ where $m_{I,q}$ corresponds to half of a distance between boundaries of a partition relating to $b_{I,q}$ and where:

$p_k$ is a parameter representative of a power applied to a $k^{th}$ user, $\sigma^2$ is variance of a noise, N is a number of sub-carriers, l is an index representative of a sub-carrier ($1 \leq l \leq N$), where the index is a positive integer, $c_{k,l}$ is a value of a spreading code for an $l^{th}$ sub-carrier and for the user k, $\hat{h}_l$ is an estimate of a coefficient of a transmission channel for the $l^{th}$ sub-carrier, $y_{k,l}$ corresponds to a real part of a complex symbol after equalization and despreading intended to be demodulated, and means for determining a simplified expression for a logarithm of a likelihood ratio $LLR(b_{Q,q})$ for a quadrature pathway for the user k in accordance with an equation:

$$LLR(b_{Q,q}) = \left(\frac{4\sqrt{p_k}}{\sigma^2} \frac{1}{N} \sum_{l=0}^{N-1} |c_{k,l}|^2 |\hat{h}_l|\right) \cdot M_{Q,q}$$

where $M_{Q,q} = y_{k,Q}$ for q=1

$M_{Q,q} = -|M_{Q,q-1}| + m_{Q,q}$ for $q>1$ where $m_{Q,q}$ corresponds to half of a distance between boundaries of a partition relating to $b_{Q,q}$ and where:

$y_{k,Q}$ corresponds to an imaginary part of the complex symbol after equalization and despreading intended to be demodulated.

7. The device according to claim 6, wherein the data are modulated according to a 4-QAM modulation, and wherein the simplified expression for the logarithm of the likelihood ratio $LLR(b_{I,q})$ for bits $b_{I,q}$ of the in-phase pathway for the user k is given by the following equation:

$$LLR(b_{I,q}) = \frac{4\sqrt{p_k}}{\sigma^2} \frac{1}{N} \left(\sum_{l=0}^{N-1} |c_{k,l}|^2 |\hat{h}_l|\right) y_{k,I}$$

where $y_{k,I}$ corresponds to the real part of the complex symbol received after equalization and despreading, and the simplified expression for the logarithm of the likelihood ratio LLR $(b_{Q,q})$ for bits $b_{Q,q}$ of the quadrature pathway for the user k is given by the following equation:

$$LLR(b_{Q,q}) = \frac{4\sqrt{p_k}}{\sigma^2} \frac{1}{N} \left(\sum_{l=0}^{N-1} |c_{k,l}|^2 |\hat{h}_l|\right) y_{k,Q}$$

where $y_{k,Q}$ corresponds to the imaginary part of the complex symbol received after equalization and despreading.

8. The device according to claim 7, wherein the communication system implements the MBOA (Multi-Band OFDM Alliance) standard.

9. The device according to claim 8, wherein the logarithm of the likelihood ratio of the bits of the in-phase and quadrature pathways for the bits $b_{m(n)}$, $b_{m(n)+50}$, $b_{m(n)+1}$, $b_{m(n)+51}$ is given by the following equations:

$$\begin{bmatrix} LLR(b_{m(n)}) \\ LLR(b_{m(n)+50}) \end{bmatrix} = \frac{4g_n \hat{h}_n + g_{n+50} \hat{h}_{n+50}}{2(g_n \hat{h}_n - g_{n+50} \hat{h}_{n+50})^2 + \sqrt{5} \hat{\sigma}^2 (4|g_n|^2 + |g_{n+50}|^2)} \begin{bmatrix} y_{n,I} \\ y_{n,Q} \end{bmatrix}$$

$$\begin{bmatrix} LLR(b_{m(n)+1}) \\ LLR(b_{m(n)+51}) \end{bmatrix} = \frac{g_n \hat{h}_n + 4g_{n+50} \hat{h}_{n+50}}{2(g_n \hat{h}_n - g_{n+50} \hat{h}_{n+50})^2 + \sqrt{5} \hat{\sigma}^2 (|g_n|^2 + 4|g_{n+50}|^2)} \begin{bmatrix} y_{n+50,I} \\ y_{n+50,Q} \end{bmatrix}$$

where:
 m(n)=2n for n=0, 1, 2, ..., 24 and m(n)=2n+50 for n=25, 26, ..., 49,
 $y_{n,I}$ and $y_{n+50,I}$ are real parts of the complex symbols received after equalization and despreading corresponding respectively to two complex 4-QAM symbols transmitted,
 $y_{n,Q}$ and $y_{n+50,Q}$ are imaginary parts of the complex symbols received after equalization and despreading corresponding respectively to the two complex 4-QAM symbols transmitted,
 $g_n$ and $g_{n+50}$ are two equalization coefficients employed,
 $\hat{h}_n$ and $\hat{h}_{n+50}$ are estimates of values of a frequency response of the transmission channel on two sub-carriers, and
 $\hat{\sigma}^2$ is estimate of the variance of the noise.

10. The device according to claim 8, wherein the simplified expression for the likelihood ratio of the bits of the in-phase and quadrature pathways for the bits $b_{m(n)}$, $b_{m(n)+50}$, $b_{m(n)+1}$, $b_{m(n)+51}$ is given by the following equations:

$$\begin{bmatrix} LLR(b_{m(n)}) \\ LLR(b_{m(n)+50}) \end{bmatrix} = (4|\hat{h}_n| + |\hat{h}_{n+50}|) \cdot \begin{bmatrix} y_{n,I} \\ y_{n,Q} \end{bmatrix}$$

$$\begin{bmatrix} LLR(b_{m(n)+1}) \\ LLR(b_{m(n)+51}) \end{bmatrix} = (|\hat{h}_n| + 4|\hat{h}_{n+50}|) \cdot \begin{bmatrix} y_{n+50,I} \\ y_{n+50,Q} \end{bmatrix}$$

where
 m(n)=2n for n=0, 1, 2, ..., 24 and m(n)=2n+50 for n=25, 26, ..., 49,
 $y_{n,I}$ and $y_{n+50,I}$ are real parts of the complex symbols received after equalization and despreading corresponding respectively to two complex 4-QAM symbols transmitted,
 $y_{n,Q}$ and $y_{n+50,Q}$ are imaginary parts of the complex symbols received after equalization and despreading corresponding respectively to two complex 4-QAM symbols transmitted, and
 $\hat{h}_n$ and $\hat{h}_{n+50}$ are estimates of values of a frequency response of the transmission channel on two sub-carriers.

11. A receiver characterized in that it is adapted for implementing a method according to claim 1.

12. A receiver characterized in that it comprises a device according to claim 6.

\* \* \* \* \*

UNITED STATES PATENT AND TRADEMARK OFFICE
CERTIFICATE OF CORRECTION

| | | |
|---|---|---|
| PATENT NO. | : 7,974,357 B2 | Page 1 of 1 |
| APPLICATION NO. | : 12/093925 | |
| DATED | : July 5, 2011 | |
| INVENTOR(S) | : Luc Maret et al. | |

It is certified that error appears in the above-identified patent and that said Letters Patent is hereby corrected as shown below:

On the Title Page

In the left column, item (73), insert --STMicroelectronics N.V., Amsterdam (NL)--.

Signed and Sealed this
Sixth Day of March, 2012

David J. Kappos
*Director of the United States Patent and Trademark Office*